United States Patent
Gonçalves

(12) 
(10) Patent No.: US 10,785,640 B2
(45) Date of Patent: Sep. 22, 2020

(54) SYSTEMS AND METHODS TO CONTROL AND MANAGE FULLY-RECONFIGURABLE HARDWARE IN A NETWORK OF MOVING THINGS

(71) Applicant: Veniam, Inc., Mountain View, CA (US)

(72) Inventor: Alexandre Paulo Fernandes de Albuquerque Cardoso Gonçalves, Matosinhos (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 16/254,647

(22) Filed: Jan. 23, 2019

(65) Prior Publication Data

US 2019/0230500 A1    Jul. 25, 2019

Related U.S. Application Data

(60) Provisional application No. 62/620,560, filed on Jan. 23, 2018.

(51) Int. Cl.
*H04W 8/24*    (2009.01)
*H04W 4/029*    (2018.01)
(Continued)

(52) U.S. Cl.
CPC .......... *H04W 8/245* (2013.01); *H04B 7/0617* (2013.01); *H04W 4/029* (2018.02);
(Continued)

(58) Field of Classification Search
CPC ..... H04W 84/005; H04W 4/40; H04W 88/08; H04W 4/44; H04W 4/70; H04W 84/18; H04W 24/02; H04W 84/12; H04W 48/20; H04W 4/046; H04W 4/46; H04W 4/80; H04W 4/029; H04W 76/10; H04W 88/10; H04W 4/027; H04W 4/50; H04W 28/021; H04W 28/08; H04W 36/08; H04W 36/32; H04W 16/00; H04W 24/04;
(Continued)

(56) References Cited

U.S. PATENT DOCUMENTS 9,648,107 B1 * 5/2017 Penilla .................... H04L 67/12
2009/0049159 A1 * 2/2009 Boscovic .............. H04W 88/06
                                                                709/221
(Continued)

FOREIGN PATENT DOCUMENTS

WO    WO-2017189035 A1 * 11/2017 ............ H04W 4/046

OTHER PUBLICATIONS

Bhode et al., An Overview of Smart Antenna Technology for Wireless Communication, dated Mar. 2001 (Year: 2001).*

*Primary Examiner* — Daniel Lai
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things).

17 Claims, 14 Drawing Sheets

(51) Int. Cl.
  *H04W 36/14* (2009.01)
  *H04B 7/06* (2006.01)
  *H04W 36/32* (2009.01)
  *H04W 88/06* (2009.01)

(52) U.S. Cl.
  CPC ........... *H04W 36/14* (2013.01); *H04W 36/32* (2013.01); *H04W 88/06* (2013.01)

(58) Field of Classification Search
  CPC ......... H04W 36/0022; H04W 36/0055; H04W 64/006; H04W 88/04; H04W 28/0215; H04W 28/0226; H04W 28/16; H04W 36/0083; H04W 36/14; H04W 4/00; H04W 4/02; H04W 4/30; H04W 88/02; H04W 88/06; H04W 8/245; H04B 7/0617
  See application file for complete search history.

(56) References Cited

U.S. PATENT DOCUMENTS

| | | | |
|---|---|---|---|
| 2010/0177712 A1* | 7/2010 | Kneckt | H04W 76/14 370/329 |
| 2010/0182916 A1* | 7/2010 | Drewes | H04B 7/15521 370/252 |
| 2014/0226639 A1* | 8/2014 | Yi | H04W 74/04 370/336 |
| 2015/0127733 A1* | 5/2015 | Ding | H04L 67/16 709/204 |
| 2016/0119739 A1* | 4/2016 | Hampel | H04W 4/70 370/315 |
| 2016/0234654 A1* | 8/2016 | Tosa | G08G 1/096791 |
| 2017/0201461 A1* | 7/2017 | Cheng | H04L 47/32 |
| 2018/0132171 A1* | 5/2018 | Mendahawi | H04W 76/10 |
| 2019/0090174 A1 | 3/2019 | Rocci et al. | |

* cited by examiner

SYSTEMS AND METHODS TO CONTROL AND MANAGE FULLY-RECONFIGURABLE HARDWARE IN A NETWORK OF MOVING THINGS

REFERENCE

This patent application makes reference to, claims priority to, and claims benefit from U.S. Provisional Application Ser. No. 62/620,560 filed on Jan. 23, 2018, and titled "SYSTEMS AND METHODS TO CONTROL AND MANAGE FULLY-RECONFIGURABLE HARDWARE IN A NETWORK OF MOVING THINGS," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
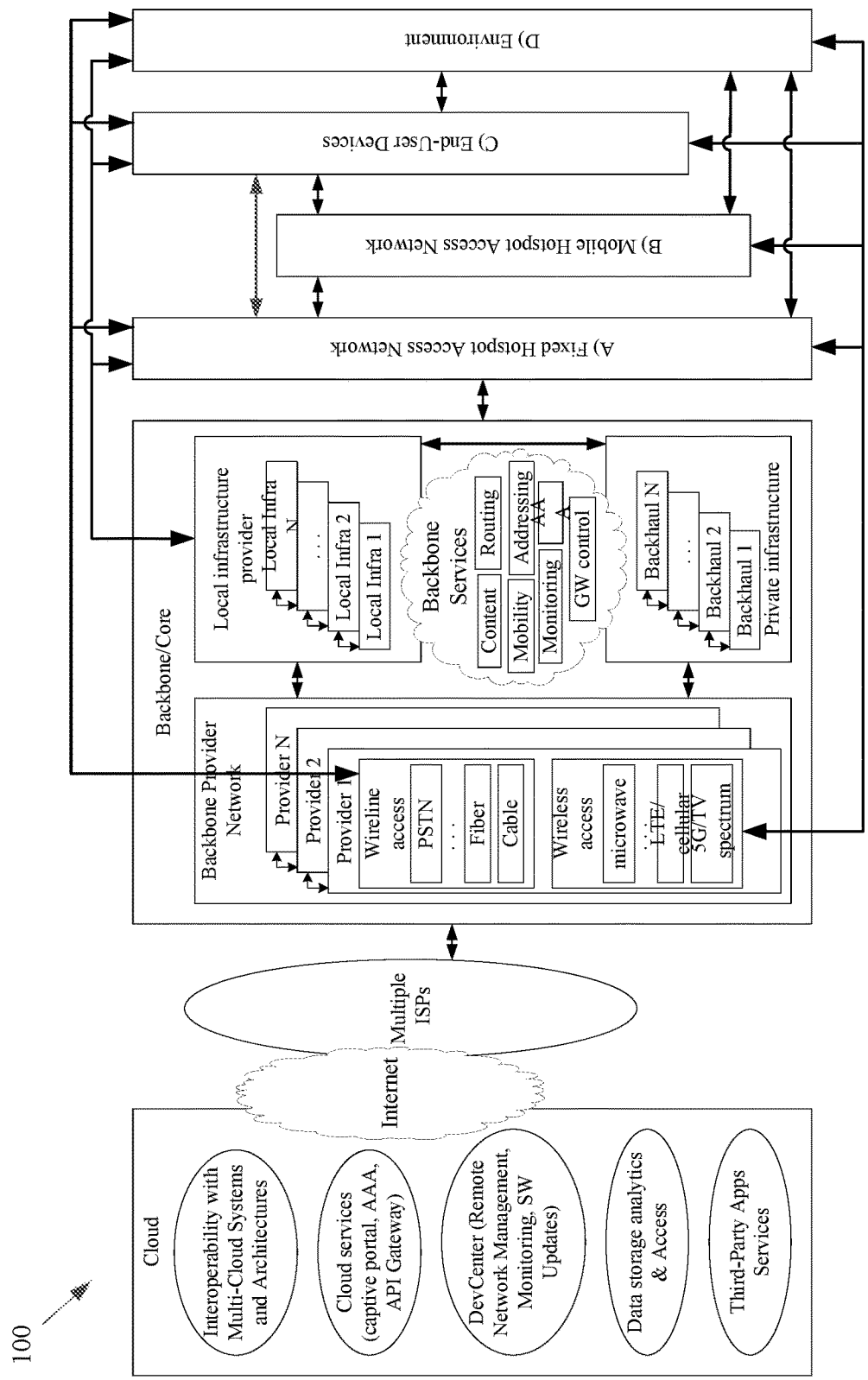
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or." As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi® hotspots. Note that Wi-Fi® is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi® networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi® (or general wireless) hotspots. For example, vehicles generally have at least one battery, vehicles are generally densely spread over the city at street level and/or they are able to establish many contacts with each other in a controlled space, and vehicles can communicate with 10x the range of normal Wi-Fi® in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi®, 802.11p, 4G, Bluetooth®, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi® hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi®, Bluetooth®, UWB, etc.). The OBUs, for example having a longer effective wireless communication range than typical Wi-Fi® access points or other wireless LAN/PAN access points (e.g., at least for links such as those based on 802.11p, etc.), are capable of substantially greater coverage areas than typical Wi-Fi® or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi® access points, etc. For example, the OBU may operate to provide in-vehicle Wi-Fi® Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi®, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi®, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi® client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi® hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi® hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi®/Bluetooth®-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi®-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi® networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi® access points from harbor local operators, and provide Wi-Fi® Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
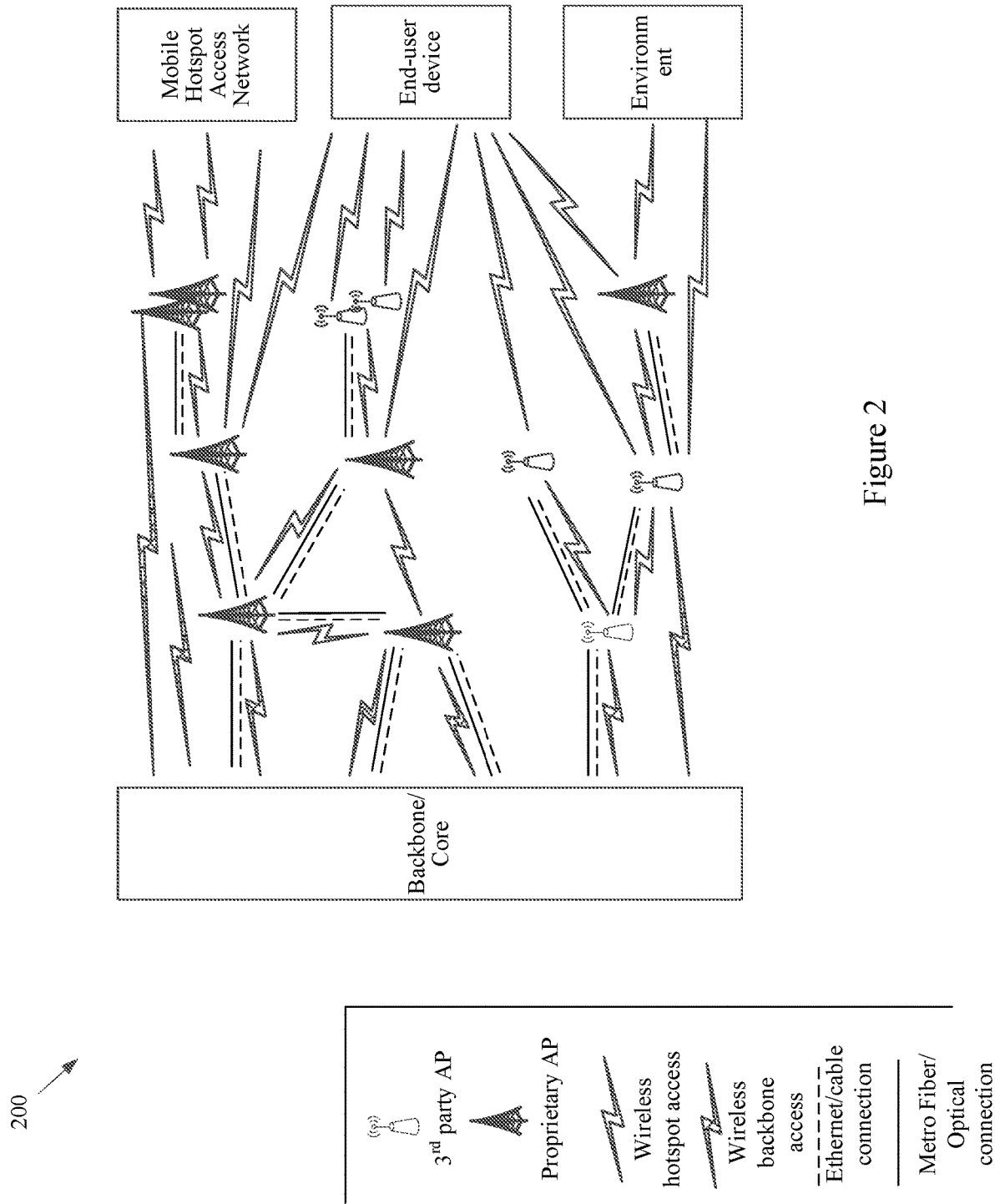
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein n.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
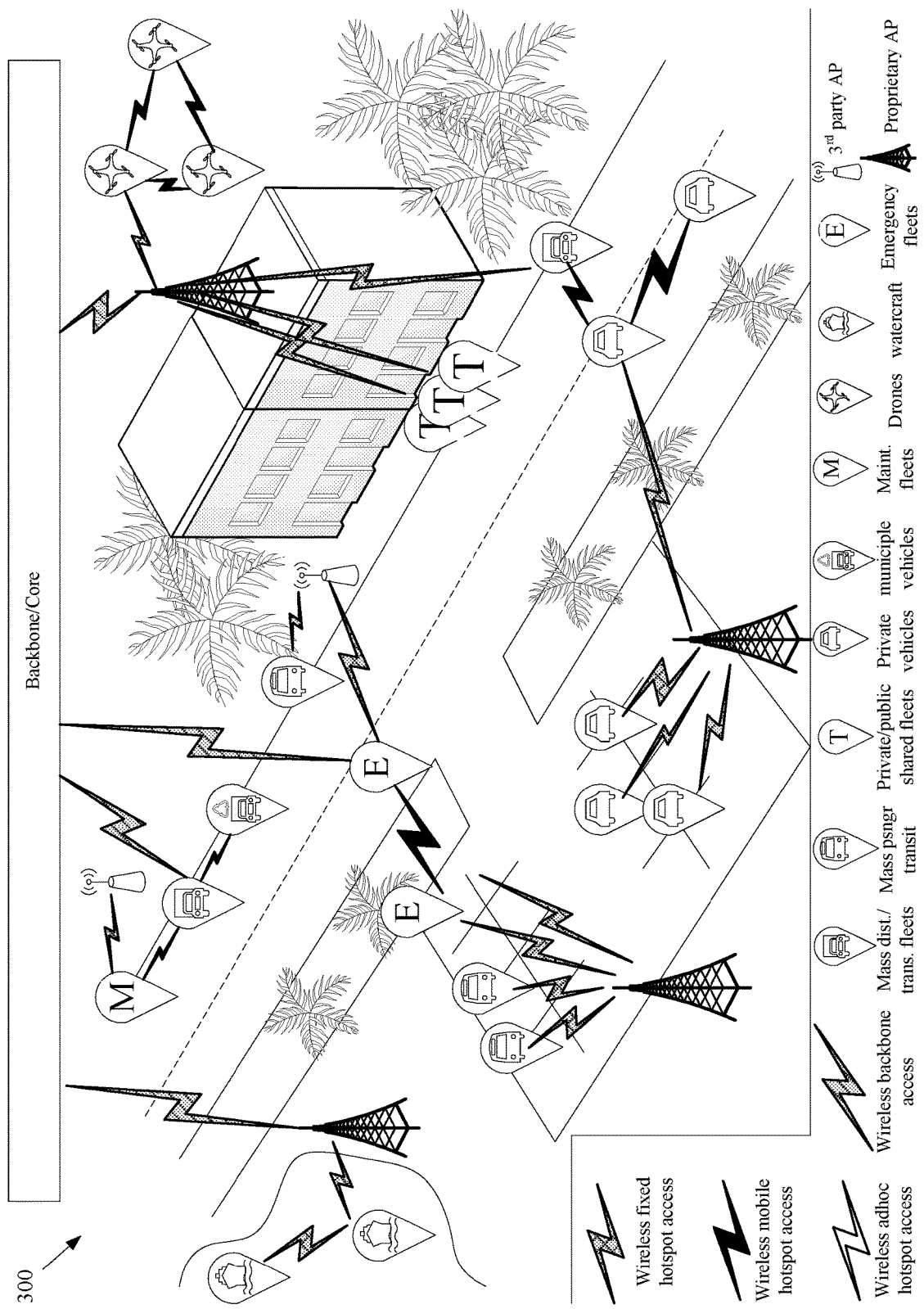
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
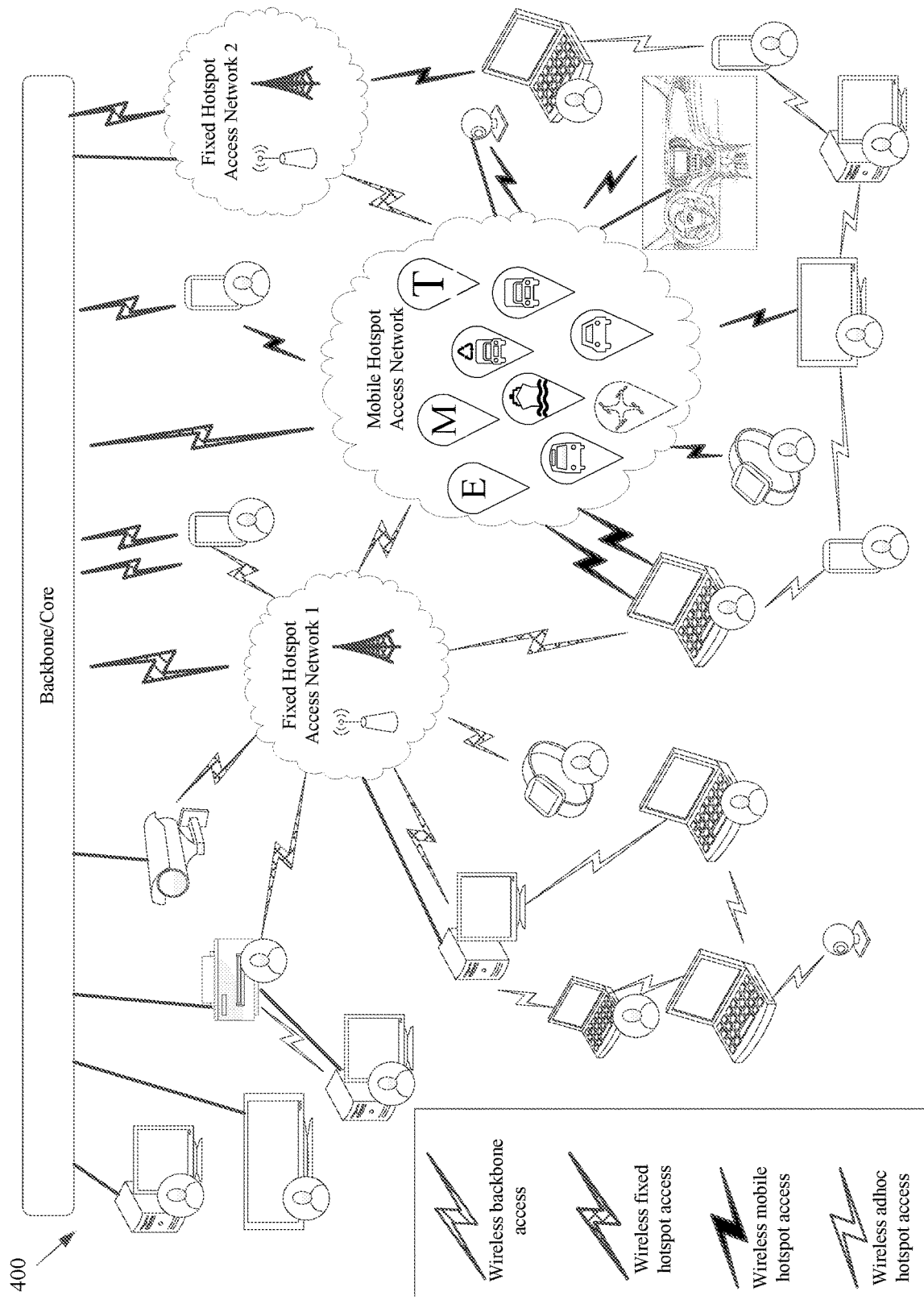
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
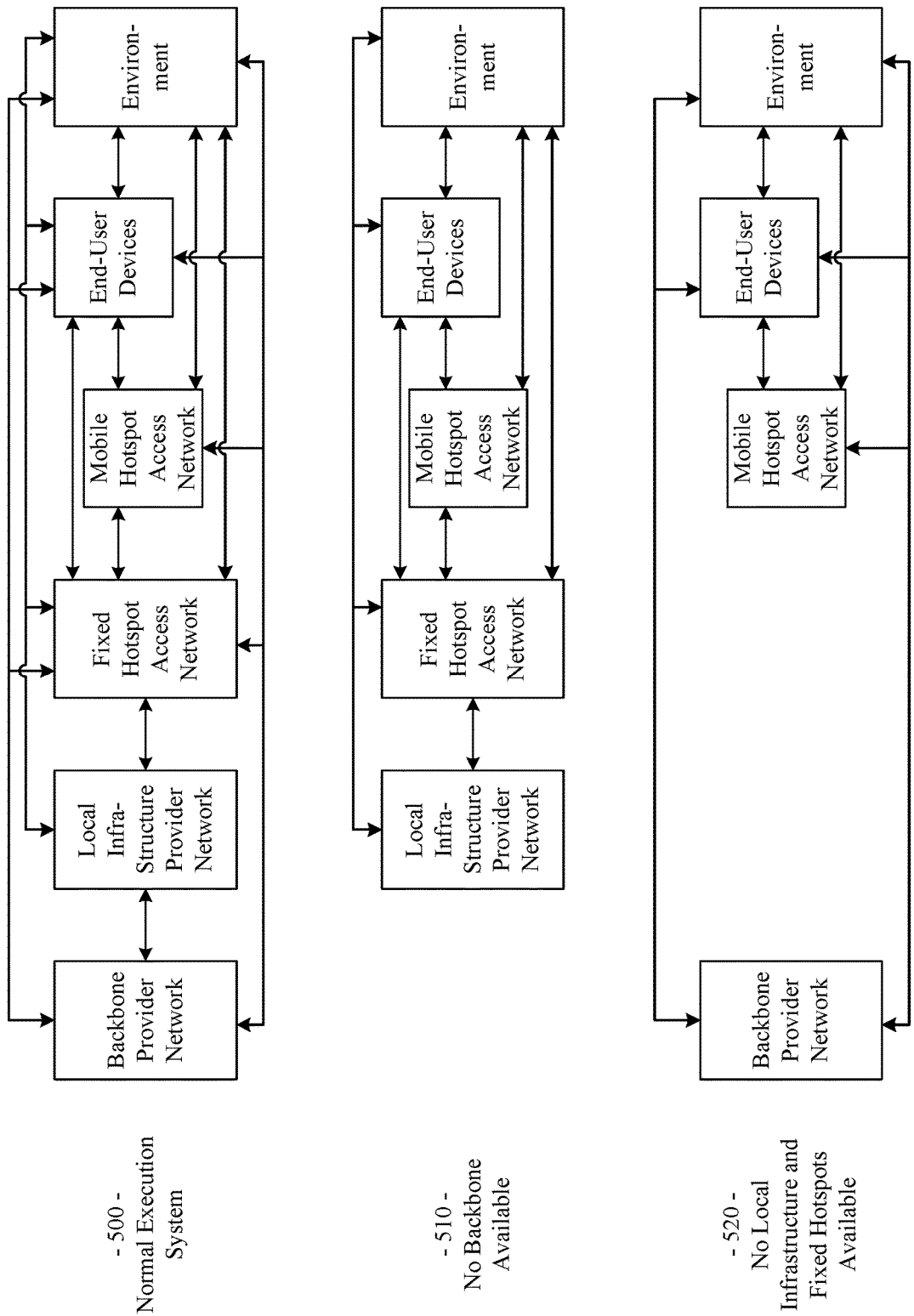
FIGS. 5A-5C show a plurality of network configurations illustrating the flexibility and/or and resiliency of a communication network, in accordance with various aspects of this disclosure.
Figure 5B:
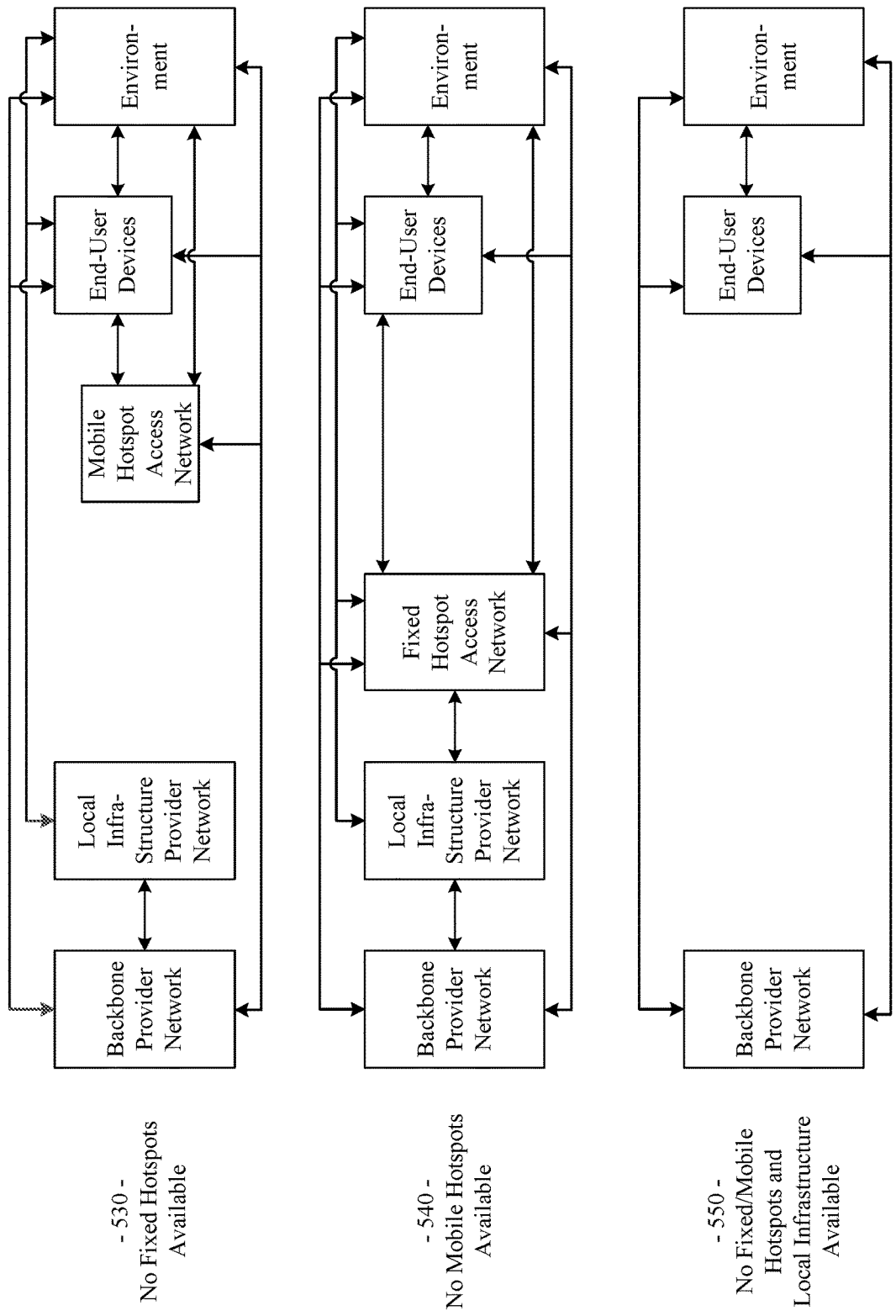
Figure 5C:
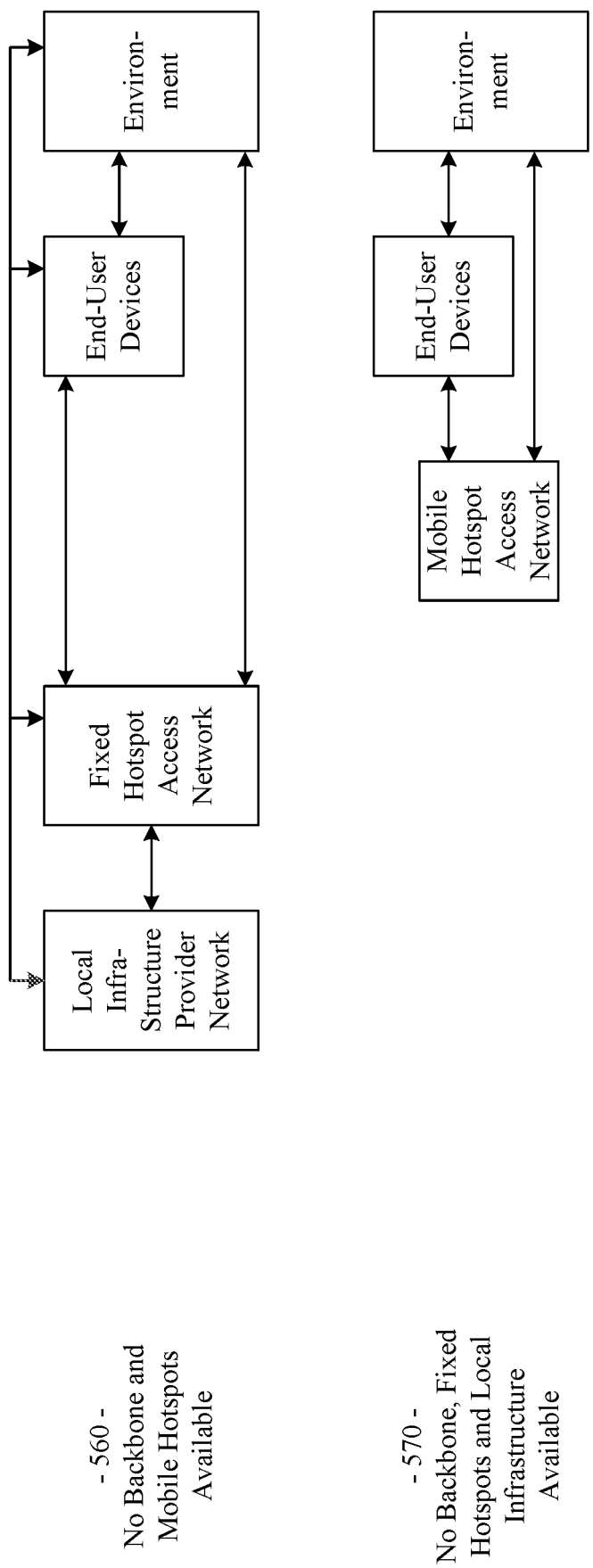

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi®, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi®, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
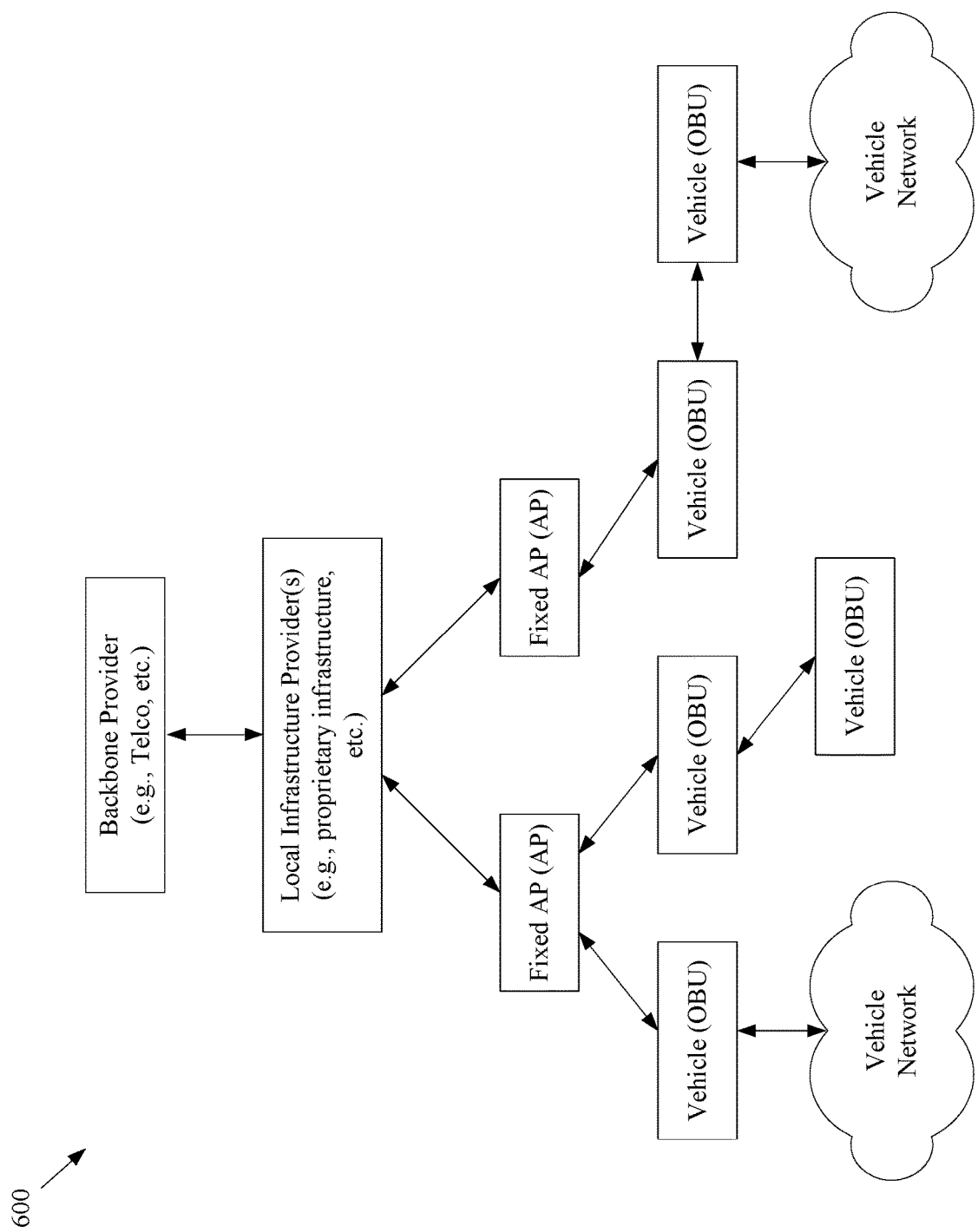
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Within a network of moving things, there exists a dynamic network environment in which the configuration and arrangement of nodes, and the wireless communication environment is constantly changing, which influences the operation of each node of the network, and the way that the nodes communicate with one another. It is expected that nodes/devices of such a network may be constantly changing their physical location, the type of communication connection in use, and the wireless connection technology being employed. The node environment in such a network is always changing, which brings constant variation of the density of nodes in a given geographic area, the number of end-user devices wirelessly connected to each network node, the variety of node services in use, the traffic carried by the network, and the level/quality of the service(s) provided. In such a dynamic scenario, nodes of the network may constantly monitor the node and network resources in use by the various applications running on and by the end-users connected to each node of the network. A number of factors of network operation may change with time and node location, factors that affect the metering, accounting, and billing for use of network resources (e.g., computing, storage, data communication) by nodes, applications, and end-users of a network according to various aspects of the present disclosure.

For example, the communication technology used by nodes of the network may be constantly evaluated and adapted to the communication needs of the node and of the network as a whole including, for example, whether each of the communications between various nodes operate as a delay-tolerant/disruption tolerant network (DTN), or involves real-time communication. In some situations, nodes of the network may make use of a commercial cellular network. In addition, the nodes of the network may aggregate the bandwidth/capacity available from several different networks using different communication technologies to provide bandwidth needed by the system of the node or services running on the node. To enable an operator of a network, such as the network of moving things described herein, to accurately track, account, and bill for network usage, and to comply with government requirements such as, for example, revenue reporting and taxation, a network according to the present disclosure may monitor and record a large number of details of node and network resource consumption including, for example, a type of resource, an amount of usage, a geographic location associated with use, and a time of use, to name but a few examples.

The nodes of a network according to various aspects of the present disclosure may record or log the technology specifics for each communication interface of each node including, for example, which type of communications interface is in use for a particular communication link, and whether particular communications interfaces are enabled or disabled, and may track the mode in which a Wi-Fi®-capable communications interface (e.g., IEEE 802.11a/b/g/n/ac/ad/af) is set to operate/is operating as, e.g., a Wi-Fi® Access Point (AP), or a Wi-Fi® Station (STA). Monitoring of technology-specific aspects of communication interfaces of nodes may also include, for example, the communication network with which the node is connected, and the location of the node with respect to geographic boundaries (e.g., "geographic fences" or "geo-fences") used to define where application of, for example, various parameters of operation, billing, and taxation for node and network resource usage are to be applied. Monitoring/tracking of various aspects of node operation may be performed including, for example, radio-frequency spectrum use, geographic areas or regions in which communication takes place, and the name(s) and/or geographic locations of the gateway(s) or access point(s) (i.e., Access Point Name (APN)) used to link to a mobile cellular network (e.g., Global System for Mobile communication (GSM), General Packet Radio Service (GPRS), 3G, 4G, 5G, Code Division Multiple Access (CDMA), Time Division Multiple Access (TDMA), or other cellular network) and/or computer network (e.g., frequently the public Internet). In addition, nodes of a network according to aspects of the present disclosure may monitor, track, and/or record their primary role or main mode of operation within the network of moving things as a whole including, for example, whether the node is acting as an on-board unit (OBU), an access point (AP) (e.g., a fixed AP), a router, and/or a network controller/mobility controller (NC/MC), for use in metering, accounting, and/or billing of use of node and/or network resources.

Network nodes in accordance with various aspects of the present disclosure have the ability to monitor, track, and/or record details of node and/or network operation including various types of context information. Such context information may include, for example, information about the physical (e.g., channel frequency, node/network element, geographic location (e.g., geographic coordinate)) and/or network environment (e.g., topology or wider network traffic/loading and equipment issues) surrounding each particular node/network element. Additional examples of context information that may be used for management of network operation (e.g., monitoring, tracking, recording, metering, accounting, and billing of resource usage) may be found, for example, in U.S. patent application Ser. No. 15/456,441, titled "Systems and Methods for Managing the Routing and Replication of Data in the Upload Direction in a Network or Moving Things,' filed Mar. 10, 2017; U.S. patent application Ser. No. 15/478,181, titled "Systems and Methods for Managing the Routing and Replication of Data in the Download Direction in a Network or Moving Things,' filed Apr. 3, 2017; U.S. patent application Ser. No. 15/481,732, titled "Systems and Methods for Managing the Scheduling and Prioritizing of Data in a Network of Moving Things,' filed Apr. 7, 2017; and U.S. patent application Ser. No. 15/499,658, titled "Systems and Methods for Managing the Storage and Dropping of Data in a Network or Moving Things,' filed Apr. 27, 2017, the complete subject matter of each of which is here incorporated herein by reference, in its respective entirety. Such items of context information may be received either from other nodes of the network, or from one or more cloud-based systems (e.g., one or more servers having information about the elements of the entire network/system).

In accordance with various aspects of the present disclosure, nodes of a network as described herein may have multiple wired network interfaces (e.g., wired/optical network interfaces (e.g., Ethernet, cable, optical fiber, etc.)) and/or wireless network interfaces. Wireless network interface may include, for example, devices/radios for communication using wireless communication technologies such as Wi-Fi®, GSM, 3G, 4G, LTE, 5G, and/or Dedicated Short Range Communication (DSRC)(e.g., IEEE 802.11p). It should be noted that wireless communication is generally referred to herein as using radio frequency (RF) technology. However, various embodiments of the disclosure need not be so limited. For example, lasers may be used for wireless communication, as well as other frequencies that are not in the electromagnetic "radio frequency" spectrum.

A node of a network as described herein may be equipped with one or several wireless network interfaces for each communication technology. A node may also be equipped with one or more sensors such as, by way of example and not limitation, a satellite-based geolocation receiver (e.g., a receiver of signals from a Global Navigation Satellite System (GNSS)/Global Positioning System (GPS)); and atmospheric pressure, humidity, precipitation, and/or temperature sensors; a sensor of light intensity; sensors for detecting various gases such as oxygen, ozone, oxides of nitrogen, sulfur dioxide; sensors or links to vehicle systems that provide vehicle movement information (e.g., speed, heading, lack of movement), and others. According to various aspects of the present disclosure, access to such information by, for example, applications running on the node, by end-user devices connected to the node, and/or by other network and/or third party systems (e.g., cloud-based systems) may be monitored, tracked, recorded for use in metering, accounting, and/or billing for such access and use. Such sensor information for a node or group of nodes may be gathered from the network interfaces and sensors of the node, from one or more neighbor nodes, and from one or more cloud-based system(s), in accordance with various aspects of the present disclosure.

A number of different types of network nodes are described above including, for example, a fixed access point (i.e., fixed AP (FAP), which may also be referred to herein as a road-side unit (RSU)), and a mobile access point (i.e., mobile AP (MAP), which may also be referred to herein as an on-board unit (OBU)). A FAP/RSU in accordance with the present disclosure may be described as a node that is located at a fixed geographic location, is equipped with a high-bandwidth backhaul connection that enables wireless access for real-time Internet or other access, and that enables offload of stored data from mobile nodes operating as delay-tolerant/disruption tolerant carriers of data. In contrast, a MAP/OBU in accordance with the present disclosure may be described as a node that acts as a mobile (e.g., vehicle resident) point of real-time and delay-tolerant wireless network access for end-user devices (e.g., smart phones, tablet computers, laptop computers) and various types of sensors (e.g., environmental, vehicle, etc.), and that wirelessly or physically transfers data from sensors, end-user devices, and other MAPs, for delivery to another MAP or a FAP/RSU. In a basic form, a network of moving things according to various aspects of the present disclosure may comprise one or more on-board units (OBUs) installed in vehicles, one or more access points (FAPs) that are at fixed geographic locations, and one or more computer systems (e.g., servers) accessible via the Internet.

A network of moving things in accordance with aspects of the present disclosure is a collection of network nodes (e.g., nodes include a number of fixed and/or mobile devices) that interact with each other using multiple telecommunication methods. The more comprehensive the list of these telecommunication methods, the more complex and extensive the hardware of the nodes of the network. The various circumstances in which the nodes operate place different requirements upon wireless (e.g., RF) communication links used by the nodes. Nodes of the network may switch between methods of wireless communication depending on a number of factors that affect communication conditions. Delay tolerance, throughput, and/or availability of RF spectrum are a few of the factors that may determine the need for a node to select a particular wireless communication link, or to switch between different types of wireless communication links. The RF spectrum(s) available for various communication purposes may vary geographically. Accordingly, the deployment and management of network nodes having wireless communication interface(s) that operate using statically defined RF channels, modulation type(s), and transmit power level(s) may be difficult, especially when field intervention by operating and service personnel is required to adapt a node for operation in a new RF environment. A network node in accordance with aspects of the present disclosure is designed to take advantage of as much available RF spectrum in the geographic area in which it is deployed and operating.

The electrical hardware (i.e., circuitry, logic, and/or executable code) of network nodes (e.g., mobile nodes/MAPs/OBUs, fixed nodes/FAPs/RSUs) that support the wireless connectivity involved in the operation of a network of moving things as described herein comprises a radio subsystem whose electrical hardware is able to be configured by software. Such a radio subsystem supports wireless communication using a wide variety of RF communication regulatory and technical standards and communication protocols, without electrical hardware changes. In accordance with aspects of the present disclosure, a number of aspects of the wireless interface(s) of a node including, by way of example and not limitation, the carrier frequency, the modulation type, and the channelization/channel designation/channel assignment are all configurable via software. Adjustments/changes to the configuration/operation of the electrical hardware (e.g., wireless communication interfaces, antennas) of a node may be determined based on several factors including, for example, the physical location/geographic position, speed, acceleration, and/or heading of the moving thing (e.g., automobile, taxi, truck, van, bus, train, airborne vehicle, water vehicle, autonomous vehicle, etc.) in which the node is installed; the status and number of other moving things (i.e., mobile nodes) that are in the vicinity (e.g., the geographic area and/or radio environment surrounding the node); and the status of fixed stations (e.g., nodes at fixed locations (FAPs)) in the area surrounding the mobile node. The status of a node may include, for example, whether the node is powered on, the number of other nodes it is able to communicate with, whether the node can communicate with a cloud server, etc. The status of a node may also include whether A network of moving things in accordance with aspects of the present disclosure may employ a common radio configuration (e.g., RF carrier/band, modulation type, communication protocol, etc.) that all nodes may use to communicate with one another, which may be referred to herein as a "default" radio configuration. Such a default radio configuration may, for example, be used to synchronize/share various types of information including, for example, geographic location information (e.g., latitude/longitude) between nodes of the network, so that the nodes are aware of the presence and physical location of other nodes of the network. Other types of information may also be shared, as described herein. The common radio configuration may, for example, be used permanently, continually, periodically, or at occurrences/events to, for example, update information among the nodes of the network including, for example, the status of each node, and to provide for network-wide synchronization via sharing of information with one or more cloud-based systems. In addition, information specifying when nodes are to turn-on/activate a specific node configuration, an amount of time that a specific node configuration is to remain active, and/or when to turn-off/deactivate a specific node configuration may be provided to one or more nodes of a network of moving things by, for example, a network controller (NC) and/or a cloud-based system, and such information may be shared with neighboring nodes (i.e., nodes within wireless communication range) by nodes that receive such information. Node configurations may include, for example, configuration of electrical hardware such as RF communication interface(s) (i.e., radio subsystems).

Nodes of a network of moving things in accordance with various aspects of the present disclosure may, for example, increase node power efficiency by configuring antennas used for wireless communication so that the antennas transmit using focused/narrowed beams of RF energy, and may maximize antenna gain to receive signals within a narrowed area of coverage. Such aspects of node configuration may be dynamic, adjusted based on each communication transmission/session, and the direction, beam width, transmit power, receive gain, and/or other wireless communication parameters may be selected/adjusted electrically and/or electro-mechanically, taking into account the physical location (e.g., latitude/longitude) of the nodes engaged in wireless communication. A node of a network of moving things operating as described herein is able to make more efficient usage of the available RF spectrum, including taking advantage of "white spaces" (frequencies allocated to a broadcasting service but not used locally) and unlicensed bands, which may vary from physical location to physical location, or geographic region to geographic region. Such flexible configuration of node electrical hardware (e.g., radio and antenna electrical hardware) also reduces the cost of physical interventions (e.g., visits by service technicians), as the node electrical hardware can be remotely configured from, for example, a computer system located in "the cloud."

Figure 7:
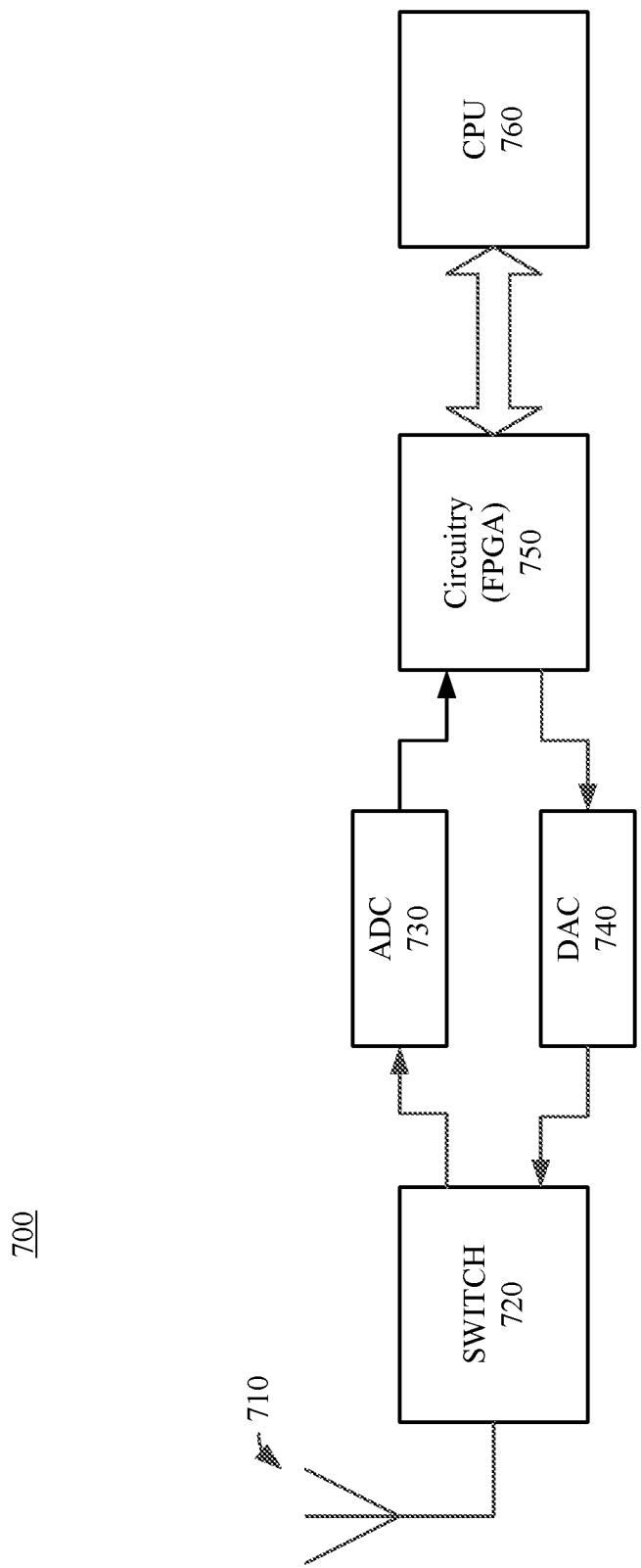
FIG. 7 is a block diagram illustrating an example continuously configurable radio subsystem that may be employed in nodes of a network of moving things, in accordance with various aspects of the present disclosure.

FIG. 7 is a block diagram illustrating an example continuously configurable radio subsystem 700 that may be employed in nodes of a network of moving things, in accordance with various aspects of the present disclosure.

Such a radio subsystem may, for example, be used in fixed and/or mobile nodes for node-to-node and node-to-cloud communication in a network of moving things, such as described above with regards to the networks 100-600 and 1000 of FIGS. 1-6, 10. As shown in FIG. 7, the illustrated components of the example radio subsystem 700 include a smart antenna 710, a switch 720, an analog-to-digital convertor (ADC) 730, a digital-to-analog convertor (DAC) 740, a circuitry 750 that may be, for example, a field-programmable gate array (FPGA), a digital signal processor (DSP), or any other appropriate device comprising a custom or semi-custom integrated circuit), and a processor 760, which may be, for example, a central processing unit (CPU), a controller, any other appropriate device comprising a custom or semi-custom processor, etc. In various embodiments, the circuitry 750 and the processor 760 may be, for example, a single processor or a single device comprising multiple processors. In accordance with various aspects of the present disclosure, a node of a network of moving things may comprise one, two, or more radio subsystems 700, to enable the node to engage in communication with multiple mobile or fixed nodes of the network, or of the infrastructure of other wireless networks (e.g., Wi-Fi®; DSRC; cellular 3G, 4G, 5G, LTE, CDMA, GSM, TDMA, etc.) It should be noted that aspects of FIG. 7 have been simplified or omitted to aid in clarification for the reader.

The smart antenna 710 of FIG. 7 may, for example, comprise an arrangement of one or more antennas or antenna elements, and may employ such an arrangement of antennas/antenna elements to do what is referred to herein as "beamforming." The term "beamforming" may be used herein to refer to the focusing, in a particular direction, of transmitted RF energy and/or of antenna receive gain. The smart antenna 710 may continuously adjust to match impedance of the one or more antenna/antenna element(s) to the switch 720 as a function of the RF signals being transmitted and received. In addition, the smart antenna 710 may detect and indicate to one or more other components of the radio subsystem 700, an indication of direction, relative to the smart antenna 710, of a source of a received RF signal. In accordance with some aspects of the present disclosure, the smart antenna 710 may comprise circuitry (e.g., signal sources and mixers) that permit the smart antenna 710 to be configured to receive RF signals within a first RF band and to convert those signals to signals within a first relatively lower RF band for processing by other components of the radio subsystem 700, and to convert signals within a second relatively lower RF band from other components of the radio subsystem 700 to signals within a second RF band, for transmission by the smart antenna 710. Such reception and transmission may, for example, be concurrent or time domain multiplexed.

The switch 720 of FIG. 7 may, in accordance with some aspects of the present disclosure, comprise an analog switching circuit that operates in one of at least two possible modes of operation that include a reception mode that passes, from the smart antenna 710 to the ADC 730, signals corresponding to RF communications received over the air, and a transmission mode that passes, from the DAC 740 to the smart antenna 710, signals corresponding to RF communications to be transmitted over the air to the intended recipient. Accordingly, the switch 720 may be in a receive mode or transmit mode. For example, in accordance with some aspects of the present disclosure, the switch 720 may normally be in the reception mode, and switched to transmission mode for transmission of RF signals. In accordance with other aspects of the present disclosure, the switch 720 may comprise a circuit (e.g., a diplexer) that permits RF signals within a first frequency band to be received concurrently with transmission of RF signals within a second frequency band disjoint from the first frequency band. The switch 720 or smart antenna 710, or one or more separate elements not separately shown in FIG. 7 may act as an amplifier of signals received by smart antenna 710 and/or of signals to be transmitted by the smart antenna 710.

The ADC 730 of FIG. 7 may be configured to perform conversion of analog signals received from the smart antenna 710 to digital sample information. The rate of such conversion may, for example, be configurable by other components (e.g., the circuitry 750 or processor 760) of the radio subsystem 700 and the signal that is converted by the ADC 730 may be in an RF band used for over the air communication, or may alternatively be in a relatively lower RF band produced by frequency conversion at the smart antenna 710, as described above. As illustrated in FIG. 7, the digital samples of the signal received and converted by the ADC 730 may be provided to other components of the radio subsystem 700 including, for example, the circuitry 750, described below.

The DAC 740 of FIG. 7 may be configured to perform conversion of digital sample information to analog signals to be transmitted by the smart antenna 710. The rate at which conversion takes place may, for example, be configurable by other components (e.g., the circuitry 750 or processor 760) of the radio subsystem 700 and the analog signal that is produced by the ADC 730 may be in an RF band used for over the air communication, or may alternatively be in a relatively lower RF band to be converted to a signal in a higher RF band at the smart antenna 710, as described above. As shown in FIG. 7, the digital samples representative of the signal produced by the DAC 740 may be provided by other components of the radio subsystem 700 including, for example, the circuitry 750, described below.

The circuitry 750 of FIG. 7 may be configured to process two flows of data representing an uplink flow of digital information representative of a signal to be transmitted by the smart antenna 710, and a downlink flow of digital information representative of a signal received by the smart antenna 710. The digital information of the uplink flow is encoded by the circuitry 750 according to the carrier and modulation scheme for which the radio subsystem 700 has been configured. In a complementary fashion, the digital information of the downlink flow is processed by the circuitry 750 to perform decoding/demodulation of the received carrier. In this manner, the circuitry 750 digitally generates the transmit signal waveform from data provided by the processor 760; and processes and decodes the received signal waveform, to make received data available to the processor 760.

The processor 760 of FIG. 7 may comprise a central processing unit integrated with or operably coupled to various forms of data and/or program storage and/or memory. Suitable processors may include those available from ARM Limited, Intel Corporation, etc. Algorithms performed by the processor 760 may select the configurations in which the radio subsystem 700 operates, and may send any configuration data/parameters to the various components of the radio subsystem 700 including, by way of example and not limitation, the circuitry 750, DAC 740, ADC 730, switch 720, and smart antenna 710. The processor 760 may also perform processing operations involved in communication of the node (e.g., OBU/MAP) of the moving thing (e.g., automobile, taxi, van, truck, bus, train, airborne vehicle, water vehicle, autonomous vehicle, etc.) in which the radio subsystem 700 is installed, with other moving things, or between a moving thing and a cloud-based system (e.g., via a fixed node such as a FAP).

Figure 8:
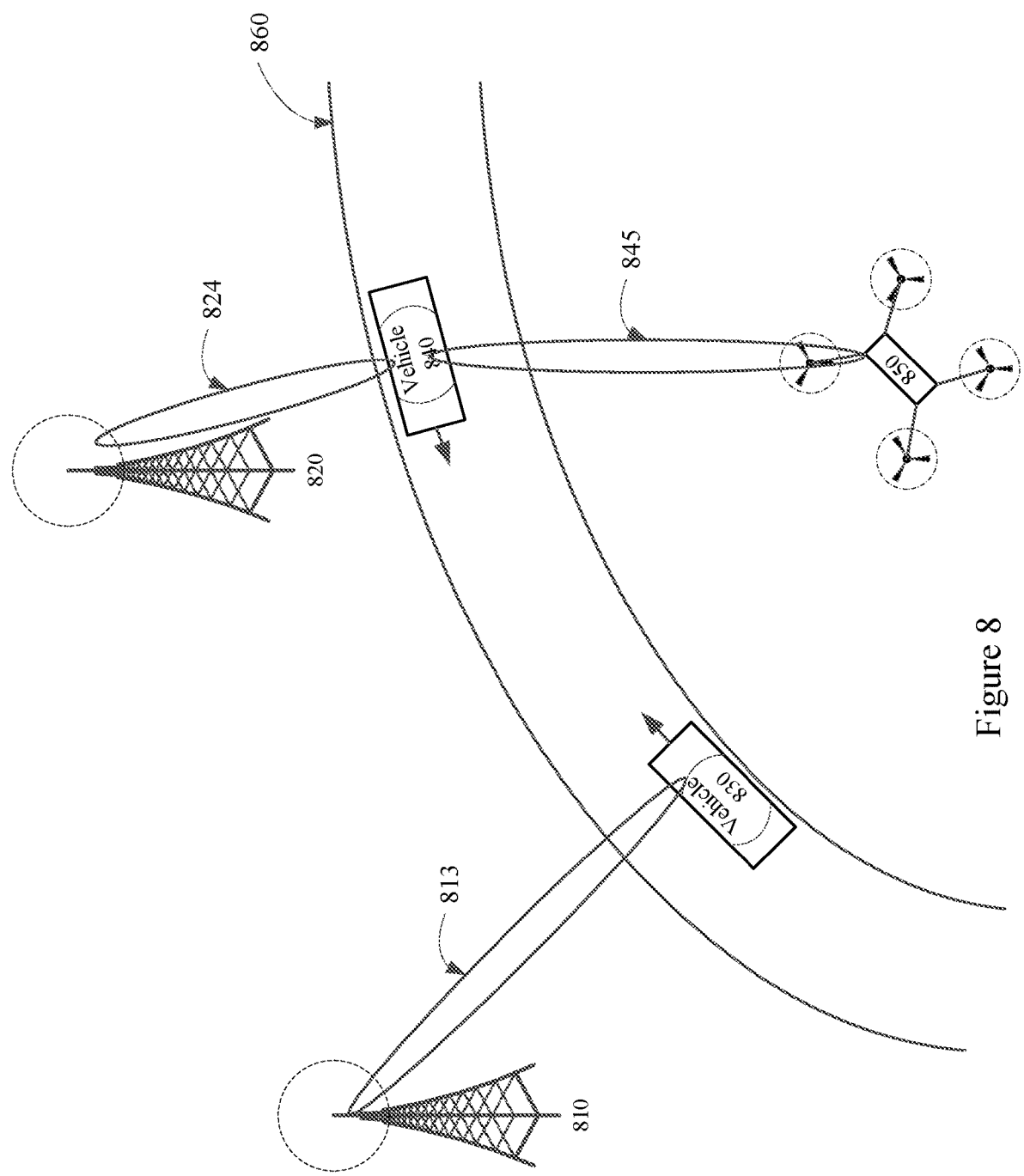
FIG. 8 illustrates an example scenario involving a number of nodes, both fixed and mobile, in which each is equipped with a reconfigurable radio subsystem of a network of moving things, in accordance with various aspects of the present disclosure.

FIG. 8 illustrates an example scenario involving a number of nodes, both fixed and mobile, where each node is equipped with a reconfigurable radio subsystem of a network of moving things, in accordance with various aspects of the present disclosure. The example scenario of FIG. 8 includes a first fixed node (FAP) 810 and a second fixed node (FAP) 820. FIG. 8 also includes a first moving thing shown as a first vehicle 830 (e.g., automobile, taxi, van, truck, bus, train, airborne vehicle, water vehicle, autonomous vehicle, etc.) having a first node in wireless communication via a first wireless link 813 with the first fixed node 810. FIG. 8 also includes a second moving thing shown as a second vehicle 840 in wireless communication via a second wireless link 824 with the second fixed node 820. The first vehicle 830 and the second vehicle 840 are shown traveling along a roadway 860. In addition, the illustration of FIG. 8 shows that the vehicle 840 is in wireless communication via a wireless link 845 with a node of an airborne moving thing shown as airborne vehicle 850 (e.g., a drone). In accordance with various aspects of the present disclosure, the wireless links 913, 824, 845 may operate using any RF band, carrier, modulation type, and/or communication protocol for which their respective radio subsystems are configurable, subject to the regulations in effect at the physical location where the scenario may take place.

In the example scenario shown in FIG. 8, the respective radio subsystems are able to use wireless RF beamforming to concentrate the RF signals with a narrowest possible beam width, using the lowest transmit power consumption, by selecting an optimal orientation of the transmitted signal. This is made possible in a network of moving things in accordance with aspects of this disclosure, because the nodes of the moving things (e.g., vehicles 830, 840, 850) have accurate estimates of physical location of the antennas of other nodes of the network (e.g., vehicles 830, 840, 850, and fixed nodes 810, 820) by sharing their physical location information (e.g., from satellite-based geo-location receivers of each node), and are therefore able to form connections using one or more RF beam(s) of a smart antenna (e.g., smart antenna 710 of FIG. 7) that is accurately directed and as narrow as desired. In addition, the moving things (e.g., vehicles 830, 840, 850) may, for example, share various information including information about traffic conditions collected by those vehicles, or shared from a cloud-based system. Such information may, for example, be shared with human operators of the two vehicles 830, 840, to warn the driver of possible dangerous situations. If the two vehicles 830, 840 are autonomous vehicles, predictions of driving conditions may be better by using such shared information.

Various kinds of information may be employed in configuring a radio subsystem (e.g., the radio subsystem 700 of FIG. 70), or other electrical hardware component, of a node of a network of moving things as described herein, to enable the node to wirelessly communicate within particular permissible RF bands (e.g., carrier frequencies, channel bandwidth, transmit power levels), using a particular RF air interface (e.g., modulation type/scheme, information coding, power control parameters/level, receiver sensitivity, encryption-related parameters, access parameters, etc.), and employing particular wireless-network-operator-specific parameters (information identifying the operator of the node/network/service provider; information that identifies the node, hopping sequence, direct sequence spreading parameters, etc.). Such information may also include information suitable for the configuration/programming of, for example, a device such as the circuitry 750 and/or the processor 760 of FIG. 7, according to the needs of the wireless network(s) to be used for communication using the intended air interface protocol.

As mentioned above, such information/parameters include, by way of illustration and not limitation, information used to specify details of and communicate using various types of wireless networks. The definition of the parameters makes it possible to dynamically switch between different types of wireless networks including, for example, cellular networks (e.g., Global System for Mobile communication (GSM), General Packet Radio Service (GPRS), 3G, 4G, 5G, Code Division Multiple Access (CDMA), Time Division Multiple Access (TDMA), or other cellular network); Dedicated Short Range Communication (DSRC) (e.g., IEEE 802.11p) networks; and/or Wi-Fi® (e.g., IEEE 802.11a/b/g/n/ac/ad/af) networks. Such information used for configuring a radio subsystem as described herein may include predetermined information (e.g., the geographic/physical location (e.g., latitude/longitude) of network fixed nodes/stations) and may depend upon real-time circumstances such as, for example, the current geographic/physical location of other network nodes both within and outside of wireless communication range of a node.

It should be noted that the each node of a network of moving things may comprise one, two, or more than two radio subsystems, and that each radio subsystem may dynamically in time communicate with a first node/sensor using a first air interface protocol (e.g., DSRC) and concurrently or alternately communicate with one or more other nodes/sensors using other respective air interface protocols (e.g., Wi-Fi®, etc.). Wireless communication with the wide variety of nodes/sensors that may exist in a network of moving things as described herein may involve constantly adjusting various aspects of a radio subsystem including, by way of example and not limitation, transmission power, carrier frequency and/or modulation type/scheme, direction of transmit/receive beamforming, and receiver sensitivity, to enable a node to operate with various nodes/sensors, using various frequency bands, employing various modulation types/schemes, at various transmit/receive power/signal levels.

For example, while wireless communication via a 3G cellular network may use code division multiple access (CDMA), a 4G cellular network may use orthogonal frequency division multiple access (OFDMA). Communication with sensors located on or in the vicinity of a moving thing (e.g., an OBU/MAP) may involve adjusting node transmitted power to a lower level than the transmit power level that may be employed when the node is involved in communication with a cellular base station. Further, it is desirable to adjust receive sensitivity of a radio subsystem to detect the lowest signal strength level possible, in order maximize a tradeoff between the signal level needed by the radio subsystem to accurately receive transmissions from various sources, and the amount of noise produced by transmitters operating at/within a given geographic location/region.

In accordance with various aspects of the present disclosure, a radio subsystem may operate in a "default" configuration that may be according to current geographic location/physical location (e.g., latitude/longitude) of the node/moving thing in which the radio subsystem operates. In reception mode, the radio subsystem may, among other things, perform detection of direction of RF signal arrival, and may sweep/scan all radio frequencies/bands for which it is configured for the current physical location of the node. In accordance with some aspects of the present disclosure, the sweeping/scanning may include portions of RF spectrum via which the radio subsystem of the node may not yet be configured to transmit, and the records of activity or lack of activity within identified portions of RF spectrum may be saved by the node and later shared with neighbor nodes and/or communicated to a cloud-based system.

Based on information from the performance of the detection and sweeping/scanning of radio spectrum, the radio subsystem of the node may then switch from the default configuration, to other configurations that support communication using other wireless network communication standards/parameters, including communication using portions of RF spectrum detected during sweeping/scanning, and for which the radio subsystem was then configured for wireless communication (e.g., transmit and receive). Following the detection and sweeping/scanning, the radio subsystem of the node/moving thing may then negotiate with one or more neighboring nodes, whether mobile (e.g., OBU/MAP) or fixed (e.g., RSU/FAP). Such negotiation may determine when (e.g., at what time or under what circumstances or conditions) the radio subsystem of the node/moving thing will return to the default configuration. The restoration of operation according to the default configuration may be based upon such information as, for example, the current geographic location or physical position of the node/moving thing, the amount of data to be communicated by the node/moving thing, the geographic or physical location/position of other nodes of the network (e.g., whether OBU/MAP and/or RSU/FAP), and/or the time interval reserved for each burst of data or communication session or interval.

Figure 9:
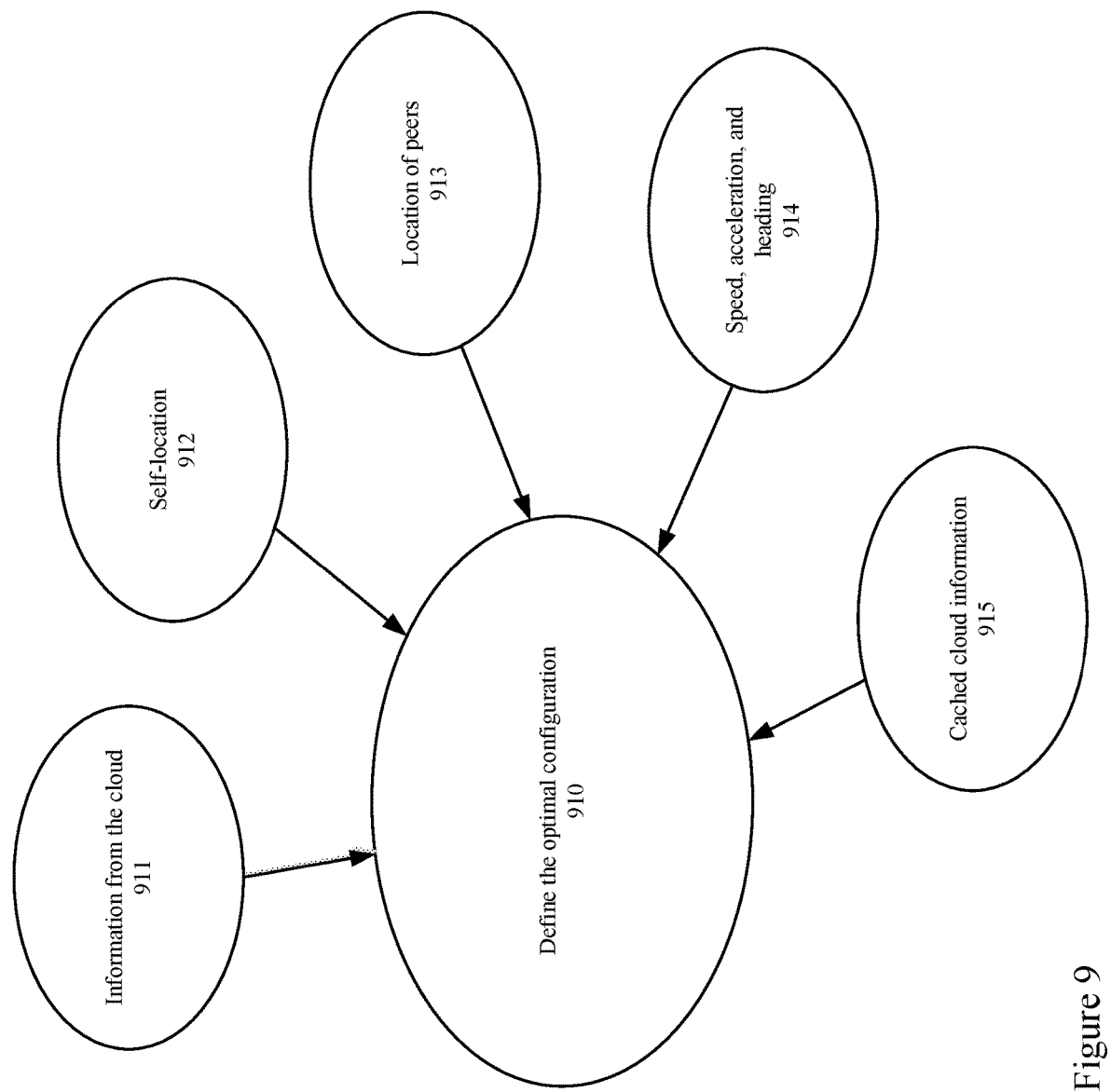
FIG. 9 is a diagram that illustrates example categories of factors that may be used as input in the process of determining optimal configuration parameters for a radio subsystem of a node of a network of moving things at any given point in time, in accordance with various aspects of the present disclosure.

FIG. 9 is a diagram that illustrates example categories of factors that may be used as input in the process of determining optimal configuration parameters for a radio subsystem of a node of a network of moving things at any given point in time, in accordance with various aspects of the present disclosure. As shown in example of FIG. 9, factors that may be used in determining optimal configuration parameters 910 for a radio subsystem (e.g., the radio subsystem 700 of FIG. 7) of any particular node of a network of moving things may include current information from a cloud-based system 911; self-location information 912 generated by the particular node; location information 913 for nodes that are neighbors of the particular node (e.g., "peers" such as mobile and/or fixed nodes); current speed, acceleration, and heading information 914 for the particular node; and cached (i.e., historical) cloud information 915. It should be noted that use of the term "peers" is not meant to suggest that moving things/nodes referred to as "peers" are necessarily equal in functionality, but that they are capable of directly communicating with one another.

In accordance with various aspects of the present disclosure, when a particular mobile node (e.g., a mobile "station" such as an OBU/MAP) of a network of moving things is in a given physical location (e.g., at a particular latitude/longitude), the particular mobile node may, for example, use information from a cloud-based system 911 to determine to which of one or more fixed nodes (e.g., "stations" such as FAPs/RSUs) the mobile node will attempt to wirelessly connect, and configuration information (e.g., for a radio subsystem) needed to establish such a wireless connection. A cloud-based system in accordance with aspects of the present disclosure may know the physical location of each node of the network (e.g., both fixed nodes (FAPs/RSUs) and mobile nodes (OBUs/MAPs)), which may, for example, be shared by nodes and one or more systems in the cloud, and the permissible types of wireless links that may be used with respective nodes, and may provide such information about one or more fixed nodes to the mobile node.

When a mobile node wishes/needs to connect to another mobile node of the network, the mobile node may choose to wirelessly connect to another mobile node using wireless communication according to the current physical location of the particular mobile node, represented in FIG. 9 as self-location information 912, and various factors that characterize the physical location of neighboring nodes and any configuration parameters needed for wireless communication with respective mobile nodes, represented in FIG. 9 as the location of peers information 913. Such information may include information characterizing movement of neighboring nodes of the network. In accordance with various aspects of the present disclosure, information about physical location (e.g., latitude/longitude, etc.) and movement (e.g., speed, acceleration, heading, etc.) of each mobile node may be wirelessly shared by the mobile node with other mobile and fixed nodes of a network as described herein.

The process of determining which of the presently neighboring node(s) (e.g., nodes within wireless communication range) of a particular node may, for example, take into account the physical location, speed, acceleration, and heading of the particular node and of each neighboring node. In accordance with aspects of the present disclosure, different wireless communication standards and different RF carriers may be used for communication between nodes, taking into account, by way of example and not limitation, the physical location, speed, acceleration, and heading of the mobile nodes of a network of moving thing as described herein.

In accordance with various aspects of the present disclosure, information available for retrieval by network nodes (e.g., mobile and fixed) from one or more cloud-based systems may include information for each of the nodes (e.g., mobile and fixed) available in the geographic area served by the network, for each communication standard allowed for use in the served geographic area. This information may be cached locally, by the nodes, in order to allow the nodes of the network to reconfigure, among other things, their respective radio subsystems, even when the services of the cloud-based systems cannot be reached. If, by chance, the cloud-based services are unreachable from a particular node, the particular node may attempt to obtain the needed information from other nodes of the network (e.g., from neighboring mobile or fixed nodes, or other nodes of the network). In accordance with aspects of the present disclosure, such information may be cached locally by the nodes of the network, to allow the nodes of the network to re-configure hardware of the node (e.g., radio subsystem, etc.), even if the node is unable to access any cloud-based service or any other nodes (e.g., mobile or fixed) of the network.

In accordance with various aspects of the present disclosure, information such as the data described above may be retrieved from neighboring nodes (e.g., "peers") using a predetermined radio subsystem configuration (e.g., a "default" configuration, as described above), which enables nodes of a network of moving things as described herein to continually, or periodically, connected with one another, and to share information about the node's physical location, the RF environment of one or more nodes of the network, the vehicle operating environment of one or more vehicles (e.g., moving things) of the network, the network environment (e.g., operating parameters, network/node configuration information, network status information, etc.). As described above, the availability of "white space(s)" in the RF spectrum varies from physical location to physical location, and may be identified and information specifying such "white space" may be shared by a node with other nodes of a network as described herein. In accordance with aspects of the present disclosure, the portions of RF spectrum available for use in wireless communication in each geographic region by nodes of a network of moving things may be retrieved from one or more cloud-based systems, and may be cached by nodes to enable node operation when node access to cloud-based systems is not possible or is unreliable.

Figure 10:
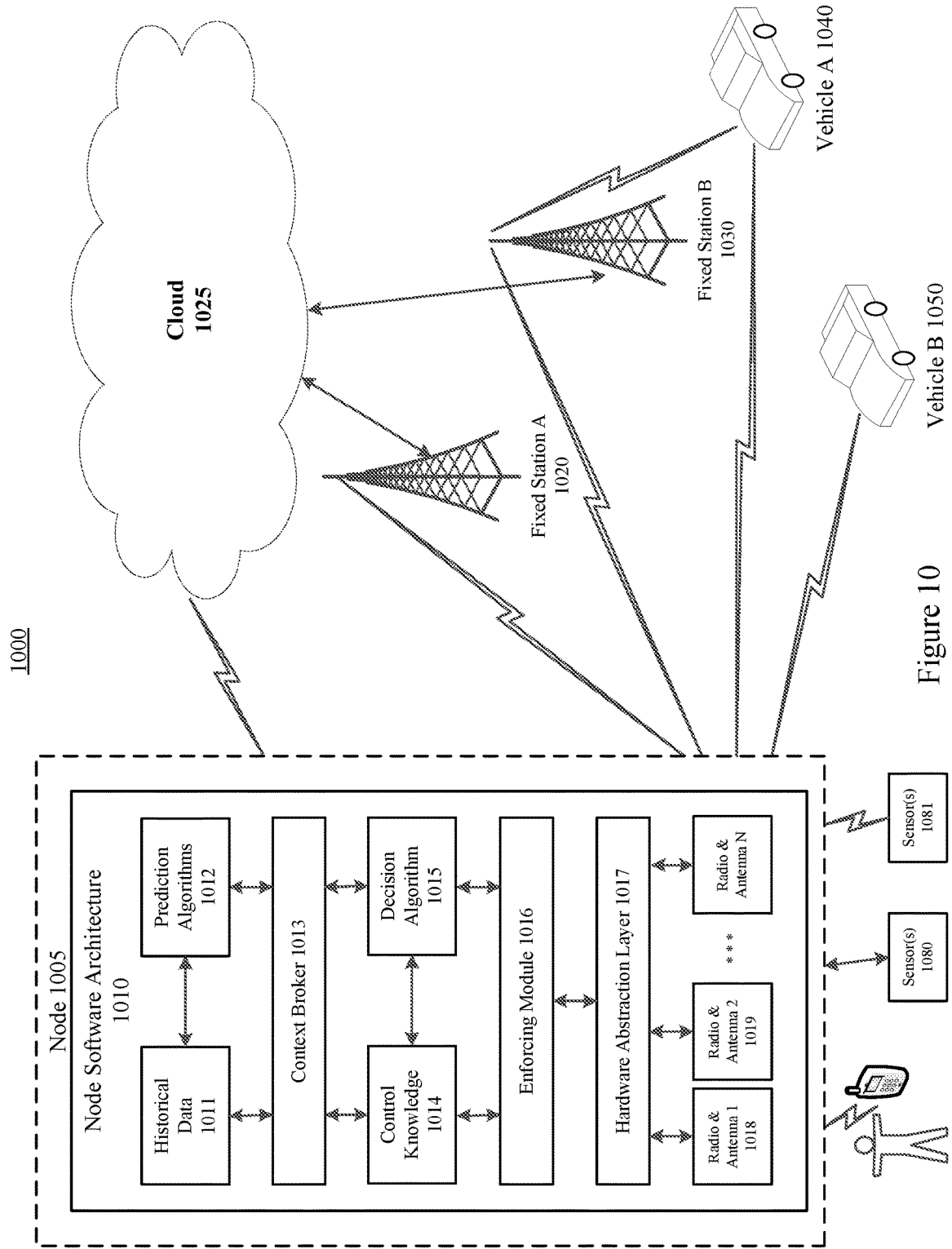
FIG. 10 is a block diagram of an example network of moving things that includes a node having a node software architecture, in accordance with various aspects of the present disclosure.

FIG. 10 is a block diagram of an example network of moving things 1000 that includes a node 1005 having a node software architecture 1010, in accordance with various aspects of the present disclosure. The node 1005 may be a fixed or mobile node such as the fixed access points (FAPs)/road-side units (RSUs) and mobile access points (MAPs)/on-board units (OBUs) described above with regard to the networks 100-600 and 800 of FIGS. 1-6 and 8. Node 1005 may wirelessly communicate (e.g., via Wi-Fi®, cellular, or other RF network, as described above) with one or more systems located in the Cloud 1025, which may correspond to the cloud element of FIG. 1, directly, via one or more fixed nodes such as fixed station (FAP) A 1020 and fixed station (FAP) B 1030, which may be connected via suitable wired or wireless communication links to the Cloud 1025. Node 1005 may also wirelessly communicate with one or more end-users 1070, may communicate via a wired link with one or more wired sensors 1080 that may be located in or near a fixed node 1005, and may communicate wirelessly (e.g., Wi-Fi®, Bluetooth®, ZigBee®, etc.) with one or more sensors 1081 that may be located within communication range of a fixed or mobile node 1005. The node 1005 may wirelessly communicate with a vehicle A (MAP) 1040 and/or vehicle B (MAP) 1050. As shown in FIG. 10, vehicle A 1040 may also communicate with fixed station B 1030.

In accordance with various aspects of the present disclosure, the node software architecture 1010 may comprise historical data 1011, prediction algorithms 1012, and a context broker 1013. These three architecture entities may be aware of real-time, historical, and predicted/processed context information (e.g., physical location information, predicted/actual next available wireless communication technology, etc.) for the node 1005, which may be used to configure the available radio subsystems (e.g., radio subsystems represented in FIG. 10 as radios and antennas 1018, 1019, . . . , N). In accordance with some aspects of the present disclosure, the historical data 1011, prediction algorithms 1012, and context broker 1013 entities may be fed by information coming from the Cloud 1025, from the fixed stations A 1020, B 1030, from vehicles A 1040, B 1050, from the wired (e.g., in-vehicle) sensors 1080, from the wireless sensors 1081, and/or from device(s) of the one or more end-users 1070.

In accordance with aspects of the present disclosure, the Cloud 1025 may feed the node software architecture 1010 with information about fixed nodes (e.g., such as fixed stations A 1020, B 1030), and information about mobile nodes (e.g., vehicles A 1040, B 1050) that are predicted to be in the vicinity of and/or wirelessly accessible to the node 1005. The fixed nodes of the network 1000 (e.g., fixed stations A 1020, B 1030) may, in turn, relay information about each moving thing of the network 1000 (e.g., the mobile node 1005 and vehicles A 1040, B 1050) to the Cloud 1025. Nodes that have neighboring mobile nodes (e.g., "peers") such as node 1005 and vehicle B 1050, may communicate directly with their neighboring node(s), sharing information about one or more best radio configuration(s) that are known and/or currently in use by the node(s). In accordance with aspects of the present disclosure, end-users and sensors, such as the one or more end-users 1070, one or more wired sensors 1080, and/or one or more wireless sensors 1081, may be taken in consideration such as, for example, when node 1005 is located in a bus, the radio subsystem(s) may be configured different when the bus has no passengers/end-users, versus when the bus is full of passengers/end-users.

In accordance with various aspects of the present disclosure, the node software architecture 1010 may also comprise control knowledge 1014, one or more decision algorithms 1015, and enforcing module 1016, which may, based on the context information received via the context broker 1013, decide, select, and enforce the most suitable configuration upon the electrical hardware of the node 1005 including, for example, the radio subsystems (e.g., radio subsystems represented in FIG. 10 as radios and antennas 1018, 1019, . . . , N) of node 1005. The hardware abstraction layer 1017 may function to isolate the enforcing module 1016 from knowledge of the specific details of the control and data interfaces of the electrical components (e.g., the smart antenna 710, switch 720, ADC 730, DAC 740, circuitry 750, and processor 760) that make up the radio and antennas (radio subsystems) 1018, 1019, . . . , N.

A radio subsystem and node software architecture in accordance with various aspects of the present disclosure enables upgrade/reconfiguration of electrical hardware of a node without need for physical human intervention at the physical locations of nodes in the field. In addition, such a radio subsystem and node software architecture provides support for world-wide operation compliant with local/national/global RF spectrum regulations. The flexibility of such a radio subsystem and node software architecture supports interoperability with any wireless network regardless of the nature of RF spectrum usage and air interface requirements, including various modulation schemes and communication protocols, enabling improved flexibility in usage of available RF spectrum and lower network operating costs. By employing various aspects of the present disclosure, manufacturers and/or operators of nodes of networks of moving things may build and use a generic device that may be configured to communicate using any wireless network, and all geographic locations may be supported using one device, reducing or eliminating many manufacturing, distribution, maintenance, software, and administrative issues that typically arise when operating a network of moving things involving RF communication equipment that is usable only in specific geographic regions.

It should be noted that referring to a cloud, such as, for example, the Cloud 1025, is similar as referring to portions of a cloud such as a cloud server.

Figure 11:
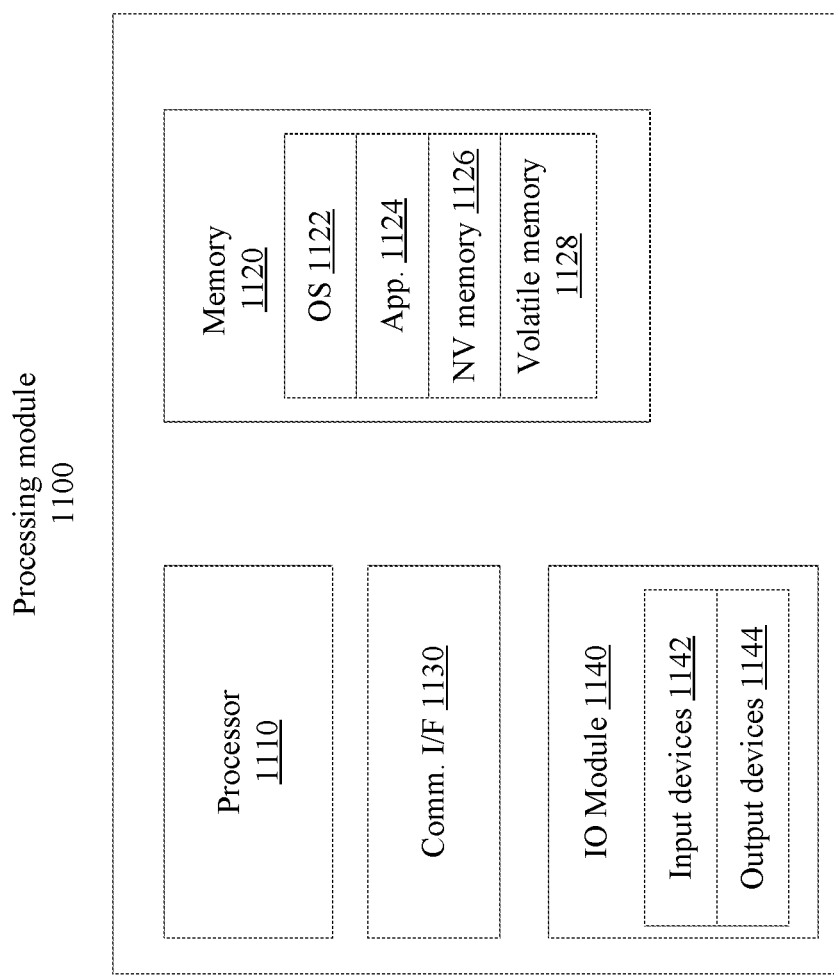
FIG. 11 is an example block diagram of a processing module for use in a node, in accordance with various aspects of the present disclosure.

FIG. 11 is an example block diagram of a processing module for use in a node, in accordance with various aspects of the present disclosure. Referring to FIG. 11, there is shown a processing module 1100 that may be present, for example, in a node in the Cloud 1025 or in a node in any of the vehicles 830-850, 1040-1050, any of the FAPs 810-820, 1020-1030, etc. All or portions of the processing module 1100 may be an original part of a node such as, for example, in any of the vehicles 830-850, 1040-1050, or may be installed after a node was manufactured or installed. The processing module 1100 may be used for one or more of the various functionalities described herein.

The processing module 1100 may comprise, for example, a processor 1110, memory 1120, a communication interface 1130, and an IO interface 1140. The processor 1110 may comprise multiple processors. In a vehicle, the processor 1110 may be a dedicated processor(s) for controlling at least a portion of the vehicle, and the processor 1110 may also operate in concert with one or more other processors that may also control at least a portion of a vehicle and/or assist in the operation of a vehicle. In the Cloud 1025, the processor 1110 may be, for example, one or more processors in a server. For example, in each of the vehicles 830-850, 1040-1050 and the Cloud 1025, the various communication interfaces for the different standards may each have a separate processor or may share a processor.

The memory 1120 may include non-volatile memory 1126 and volatile memory 1128. The storage for holding local data may be part of the memory 1120 or comprise separate memory. The operating system 1122 and applications 1124 may be stored in, for example, the non-volatile memory 1126, and may be copied to volatile memory 1128 for execution. The node software architecture 1010 may be stored in, for example, the memory 1120. The applications 1124 may comprise, for example, data learning software such as, for example, machine learning, deep learning, and/or other artificial intelligence software to process data. Various embodiments of the disclosure may use different memory architectures that are design and/or implementation dependent. Various nodes may have access to mass storage devices.

The communication interface 1130 may allow the processing module 1100 to communicate with other devices via, for example, a wired protocol such as USB, Ethernet, Firewire, etc., or a wireless protocol such as Bluetooth®, Near Field Communication (NFC), Wi-Fi®, etc. The various types of radios for communication may be referred to as a transceiver for the sake of simplicity. The communication may be, for example, with various sensors and/or devices that can relay sensor data. The communication interface 1130 may be used by the vehicles 830-850, 1040-1050 and the Cloud 1025 to communicate with each other. The communication interface 1130 may also be used to communicate with other networks including, for example, the networks described with respect to FIGS. 1-6 and 10. The radio subsystem 700 may be a part of, for example, the communication interface 1130.

The processing module 1100 may also comprise the IO module 1140 for communication with a user via the input devices 1142 and output information to be displayed on output devices 1144. The input devices 1142 may comprise, for example, buttons, touch sensitive screen, which may be a part of a display, a microphone, etc. The output devices 1144 may comprise, for example, the display, a speaker, LEDs, etc.

The processor 1110 may operate using different architectures in different embodiments. For example, the processor 1110 may use the memory 1120 to store instructions to execute, or the processor 1110 may have its own memory (not shown) for its instructions. Furthermore, various embodiments may have the processor 1110 work in concert with other processors in the vehicle in which the processing module 1100 is located. Various embodiments may also allow any of the processors to work individually.

Various embodiments may use other architectures where the different functionalities may be grouped differently. For example, the grouping may be in different integrated circuit chips. Or the grouping may combine different devices such as the IO module 1140 and the communication interface 1130 together, etc.

Figure 12:
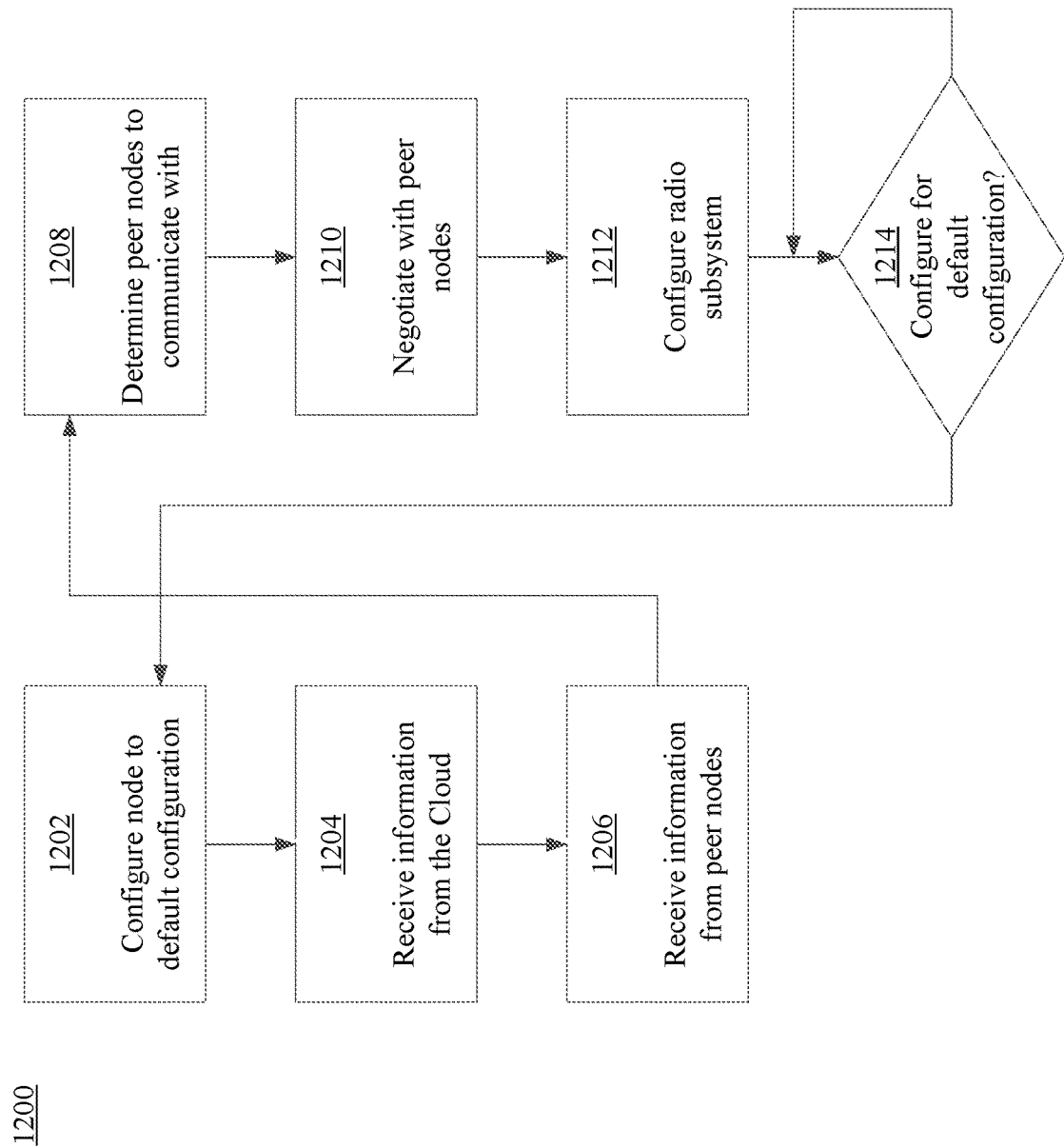
FIG. 12 is an example flow diagram of communication by a node, in accordance with various aspects of the present disclosure.

FIG. 12 is an example flow diagram of communication by a node, in accordance with various aspects of the present disclosure. Referring to FIG. 12, there is shown the flow diagram 1200 comprising blocks 1202 to 1212. In block 1202, a node 1005 may have its radio subsystem 700 configured for a default configuration for RF communication in the, for example, network 1000. The default configuration may be because the node 1005 has recently been initialized or because the node 1005 has returned to the default configuration from another configuration. Accordingly, the node 1005 may be able to communicate with other nodes in the network 1000 via a particular channel(s) and frequency spectrum(s), using a particular modulation method associated with the default communication configuration.

In block 1204, the node 1005 may receive information from the Cloud 1025. For example, some of the information may include movement information for other nodes in the network 1000. The movement information for a node may comprise, for example, location information, speed information, direction of motion information, acceleration information, etc. It should be noted that in an example embodiment movement information for a FAP may only include its location information. The Cloud 1025 may also provide, for example, the frequencies available for the communication in the network.

The Cloud 1025 may provide movement information for the FAPs 1020 and 1030, as well as for the MAPs 1040 and 1050 as may be available to the Cloud 1025. The Cloud 1025 may receive various information, including movement information, for a MAP from the MAP or from other nodes that have information regarding the MAP.

In block 1206, the node 1005 may receive information, including movement information, from peer nodes, where a peer node is a node with which the node 1005 is able to directly communicate. The node 1005 may control its radio subsystem to perform antenna impedance matching as well as beamforming to optimize transmission and reception at various times for any given communication configuration.

Accordingly, in block 1208 the node 1005 may determine which of the FAPs that the Cloud 1025 provided information for may be nodes the node 1005 will communicate with. The node 1005 may also determine from the information provided by the mobile nodes (MAPs), as well as the Cloud 1025 when the Cloud 1025 has such information, which MAPs to communicate with. A MAP may generally provide information about itself, as well as about other nodes in some cases. In various embodiments, the node 1005 may communicate with the FAPs before determining which MAPs to communicate with. The determination of which nodes to communicate with may depend on, for example, how far the node 1005 is from a peer node, whether the node 1005 is moving away from a peer node, how loaded a peer node is with regard to communication tasks or other tasks that may provide a heavy load for that node, etc.

Various nodes may cache the information received from the Cloud 1025 as well as from other nodes. This may be useful, for example, when the node(s) lose communication with the Cloud 1025. The various nodes may still be able to access the cached information to determine a communication configuration to use.

In block 1210, the node 1005 may negotiate with the peer nodes that it has determined to communicate with, where these peer nodes may comprise mobile and static peer nodes. The negotiation may result in using another communication configuration that may include changing, for example, the communication network via which the node 1005 and the peer nodes will communicate. The negotiation may use various information including the movement information of the node 1005 and other nodes. The negotiation may also determine the conditions under which the nodes may revert to the default communication configuration. The reversion to the default communication configuration may be dependent on, for example, location of the mobile node 1005, an amount of data that needs to be transferred to and/or from the mobile node 1005, the location of at least one of the peer nodes, and a time interval reserved for a burst of data by the nodes.

In block 1212, the radio subsystem may be configured to the negotiated communication configuration. Accordingly, the node 1005 may communicate with its peer nodes using a certain wireless network, with given frequency spectrum, channels, and modulation scheme. Configuring the radio subsystem may be based on one or more of current movement information, historical movement information, and predicted movement information as described further with respect to FIG. 10.

In block 1214, the node 1005 may check whether the radio subsystem should be configured for the default communication configuration. Upon determining that it should be configured so, the next step may be to block 1202. Otherwise, the node 1005 may perform the check at block 1214 periodically or when certain events happen. For example, the events may be when the amount of data to be communicated is beyond a threshold level, when there is congestion, etc.

Accordingly, it may be seen that various aspects of the present disclosure provide for a method for managing a mobile node for communication in a network. The method may comprise configuring a radio subsystem via software to change one or more of: a carrier frequency, modulation method of the carrier frequency, and channels used for the communication. Configuring the radio subsystem may depend on one or both of movement information of the mobile node and movement information of peer nodes. The movement information may comprise one or more of location information; speed information, direction of motion information, and acceleration information.

A peer node may be a mobile peer node or a static peer node. The mobile node may determine which of static peer nodes to connect to based on information from a cloud server (for example, Cloud 1025). The mobile node may determine which of the mobile peer nodes to connect to based on movement information of the mobile peer nodes. The movement information of the peer nodes may be received from, for example, a cloud server.

The movement information of a specific one of the peer nodes may be received from, for example, the specific peer node or from another one of the peer nodes. The movement information of the mobile node and the movement information of the peer nodes may be cached by one or more of: the mobile node and one or more of the peer nodes.

Configuring the radio subsystem may also comprise, for example, beamforming for one or both of transmission and reception, as well as for antenna impedance matching. The radio subsystem may be configured to switch from using a first network for communication to a second network for communication. The communication of a node may initially be via a default communication configuration.

The mobile node may configure the radio subsystem for communication in another communication configuration after negotiation with one or more of the peer nodes in the network. The negotiation may comprise determining when the mobile node configures the radio subsystem back to the default communication configuration. The radio subsystem may be configured for the default communication configuration based on one or more of: location of the mobile node, an amount of data that needs to be transferred to and/or from the mobile node, the location of at least one of the peer nodes, and a time interval reserved for a burst of data.

The frequencies available for the communication in the network may be received from a cloud server. Configuring the radio subsystem may be based on one or more of current movement information, historical movement information, and predicted movement information.

Various aspects of the present disclosure may also provide for a mobile node in a communication network comprising a radio subsystem enabled to communicate in a communication network. The radio subsystem may comprise a smart antenna enabled to receive radio frequency (RF) signals, an RF switch enabled to communicate signals to one or both of an analog-to-digital converter (ADC) and a digital-to-analog converter (DAC), and a processor. The processor may be enabled to communicate signals from one or both of the ADC and the DAC; configure the radio subsystem via software to change one or more of a carrier frequency, modulation method of the carrier frequency, and channels used for the communication. The processor may also be enabled to configure the radio subsystem depending on one or both of movement information of the mobile node and movement information of peer nodes. The movement information may comprise one or more of location information, speed information, direction of motion information, and acceleration information.

The mobile node may be enabled to receive one or both of: the movement information of the peer nodes from a cloud server and the movement information of a specific one of the peer nodes from one of the peer nodes. The radio subsystem may be initially configured to communicate via a default communication configuration.

The processor may be enabled to negotiate with one or more of the peer nodes in the network to configure the radio subsystem to communicate in another communication configuration, and configure the radio subsystem back to the default communication configuration based on one or more of location of the mobile node, an amount of data that needs to be transferred to and/or from the mobile node, the location of at least one of the peer nodes, and a time interval reserved for a burst of data.

The processor of the mobile node may be enabled to cache the movement information of the mobile node and the movement information of the peer nodes.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi® Internet connection that may appear to the end user to be the same as the Wi-Fi® Internet connection at the user's home, user's workplace, fixed public Wi-Fi® hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi® AP of a vehicle, the vehicle (or the access point thereof, for example an OBU) is moving between multiple access points (e.g., Fixed APs, other Mobile APs, cellular base stations, fixed Wi-Fi® hotspots, etc.). For example, mobility management implemented in accordance with various aspects of the present disclosure supports the mobility of each vehicle and its users across different communication technologies (e.g., 802.11p, cellular, Wi-Fi®, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What are claimed:

1. A method for managing a mobile node for communication in a network, comprising:
   configuring a radio subsystem via software to change one or more of a carrier frequency, modulation method of the carrier frequency, and channels used for the communication with peer nodes, wherein each of the peer nodes is a mobile peer node or a static peer node;
   determining, by the mobile node, one or more of the static peer nodes to connect to based on information received from one or more cloud servers;
   determining, by the mobile node, one or more of the mobile peer nodes to connect to based on information received from the one or more cloud servers; and
   communicating, by the mobile node, with at least one of the determined one or more of the static peer nodes prior to communicating with at least one of the determined one or more of the mobile peer nodes,
   wherein configuring the radio subsystem depends on one or both of movement information of the mobile node and movement information of peer nodes, the movement information comprising one or more of:
   location information;
   speed information;
   direction of motion information; and
   acceleration information.

2. The method of claim 1, wherein the movement information of the peer nodes is received from the one or more cloud servers.

3. The method of claim 1, wherein the movement information of a specific one of the peer nodes is received from one of the peer nodes.

4. The method of claim 1, wherein the movement information of the mobile node and the movement information of the peer nodes are cached by one or more of: the mobile node and one or more of the peer nodes.

5. The method of claim 1, wherein configuring the radio subsystem comprises beamforming for one or both of transmission and reception.

6. The method of claim 1, wherein the radio subsystem is configured to switch from using a first network for communication to a second network for communication.

7. The method of claim 1, wherein the communication is initially via a default communication configuration.

8. The method of claim 7, configuring, by the mobile node, the radio subsystem for communication in another communication configuration after negotiation with one or more of the peer nodes in the network.

9. The method of claim 8, wherein the negotiation comprises determining when the mobile node configures the radio subsystem back to the default communication configuration.

10. The method of claim 9, wherein the radio subsystem is configured for the default communication configuration based on one or more of: location of the mobile node, an amount of data that needs to be transferred to and/or from the mobile node, the location of at least one of the peer nodes, and a time interval reserved for a burst of data.

11. The method of claim 1, wherein frequencies available for the communication in the network is received from the one or more cloud servers.

12. The method of claim 1, wherein configuring the radio subsystem is based on one or more of current movement information, historical movement information, and predicted movement information.

13. A mobile node in a communication network, comprising a radio subsystem enabled to communicate in a communication network, wherein the radio subsystem comprises:
   a smart antenna enabled to receive radio frequency (RF) signals;
   an RF switch enabled to communicate signals to one or both of an analog-to-digital converter (ADC) and a digital-to-analog converter (DAC); and
   a processor enabled to:
      communicate signals from one or both of the ADC and the DAC;
      configure the radio subsystem via software to change one or more of a carrier frequency, modulation method of the carrier frequency, and channels used for the communication with peer nodes, wherein each of the peer nodes is a mobile peer node or a static peer node;
      determine, by the mobile node, one or more of the static peer nodes to connect to based on information received from one or more cloud servers;
      determine, by the mobile node, one or more of the mobile peer nodes to connect to based on information received from the one or more cloud servers;
      communicate, by the mobile node, with at least one of the determined one or more of the static peer nodes prior to communicating with at least one of the determined one or more of the mobile peer nodes; and
      configure the radio subsystem depending on one or both of movement information of the mobile node and movement information of peer nodes, the movement information comprising one or more of:
      location information;
      speed information;
      direction of motion information; and
      acceleration information.

14. The mobile node of claim 13, wherein the mobile node is enabled to receive one or both of:
   the movement information of the peer nodes from one or more cloud servers; and
   the movement information of a specific one of the peer nodes from one of the peer nodes.

15. The mobile node of claim 13, wherein the radio subsystem is initially configured to communicate via a default communication configuration.

16. The mobile node of claim 15, wherein the processor is enabled to:
   negotiate with one or more of the peer nodes in the network to configure the radio subsystem to communicate in another communication configuration; and
   configure the radio subsystem back to the default communication configuration based on one or more of: location of the mobile node, an amount of data that needs to be transferred to and/or from the mobile node, the location of at least one of the peer nodes, and a time interval reserved for a burst of data.

17. The mobile node of claim 13, wherein the processor is enabled to cache the movement information of the mobile node and the movement information of the peer nodes.

\* \* \* \* \*